United States Patent
Sasse et al.

(10) Patent No.: US 10,859,385 B2
(45) Date of Patent: Dec. 8, 2020

(54) METHODS AND SYSTEMS FOR GENERATING ALTERNATIVE ROUTES

(71) Applicant: TomTom Navigation B.V., Amsterdam (NL)

(72) Inventors: Jan-Ole Sasse, Berlin (DE); Tetyana Dzyuba, Berlin (DE)

(73) Assignee: TOMTOM NAVIGATION B.V., Amsterdam (NL)

( * ) Notice: Subject to any disclaimer, the term of this patent is extended or adjusted under 35 U.S.C. 154(b) by 32 days.

(21) Appl. No.: 14/917,612

(22) PCT Filed: Sep. 9, 2014

(86) PCT No.: PCT/EP2014/069187
§ 371 (c)(1),
(2) Date: Mar. 9, 2016

(87) PCT Pub. No.: WO2015/032975
PCT Pub. Date: Mar. 12, 2015

(65) Prior Publication Data
US 2016/0223351 A1   Aug. 4, 2016

(30) Foreign Application Priority Data

Sep. 9, 2013   (GB) .................................. 1316013.0

(51) Int. Cl.
*G01C 21/34*   (2006.01)
(52) U.S. Cl.
CPC ..... *G01C 21/3415* (2013.01); *G01C 21/3453* (2013.01); *G01C 21/3461* (2013.01)
(58) Field of Classification Search
None
See application file for complete search history.

(56) References Cited

U.S. PATENT DOCUMENTS

| | | | |
|---|---|---|---|
| 5,220,507 A | 6/1993 | Kirson | |
| 5,654,718 A * | 8/1997 | Beason | G01S 19/235 342/357.62 |

(Continued)

FOREIGN PATENT DOCUMENTS

| | | |
|---|---|---|
| CN | 1673686 A | 9/2005 |
| CN | 1734238 A | 2/2006 |

(Continued)

OTHER PUBLICATIONS

Moore, An Introduction to the Global Positioning System and Its Applications IEE (1994) (Year: 1994).*
TomTom, Our Company, History (Jul. 14, 2018) (Year: 2018).*
International Search Report dated Jan. 9, 2015 of International Application No. PCT/EP2014/069187.

(Continued)

*Primary Examiner* — Kevin P Mahne
(74) *Attorney, Agent, or Firm* — Park, Vaughan, Fleming & Dowler LLP

(57) ABSTRACT

A method is disclosed for generating routes in an area covered by an electronic map. The map comprises a plurality of segments representing navigable segments of a navigable network in the area covered by the electronic map. A first route is generated between a first location and a second location in the area. A central portion of the first route is defined, wherein the central portion has an extent along the first route that is determined based on a distance between the first and second locations. The relative extent of the central portion along the first route is inversely related to the distance between the first and second locations. One or more navigable segments forming the defined central portion along the first route are identified, and a cost penalty applied to the identified navigable segment(s) so as to make the segment(s) less favourable when a route is generated through the navigable network. An alternative route is then generated between the first location and second location.

15 Claims, 4 Drawing Sheets

(56) References Cited

U.S. PATENT DOCUMENTS

| | | | |
|---|---|---|---|
| 5,862,511 A * | 1/1999 | Croyle | G01C 21/28 |
| | | | 701/445 |
| 5,931,888 A * | 8/1999 | Hiyokawa | G01C 21/34 |
| | | | 701/411 |
| 6,061,629 A | 5/2000 | Yano et al. | |
| 6,732,048 B2 | 5/2004 | Blewitt | |
| 8,645,061 B2 | 2/2014 | Newson et al. | |
| 2002/0143464 A1 * | 10/2002 | Blewitt | G01C 21/3484 |
| | | | 701/411 |
| 2009/0276150 A1 | 11/2009 | Vorlander | |
| 2010/0312466 A1 * | 12/2010 | Katzer | G01C 21/3492 |
| | | | 701/533 |
| 2011/0112760 A1 | 5/2011 | Serbanescu et al. | |
| 2011/0313648 A1 | 12/2011 | Newson et al. | |
| 2012/0072107 A1 * | 3/2012 | Okude | G01C 21/343 |
| | | | 701/416 |
| 2014/0058660 A1 * | 2/2014 | Singh | G01C 21/3641 |
| | | | 701/411 |

FOREIGN PATENT DOCUMENTS

| | | |
|---|---|---|
| CN | 1987359 A | 6/2007 |
| CN | 101688781 A | 3/2010 |
| CN | 102918361 A | 2/2013 |
| EM | 0777206 A1 | 6/1997 |
| EP | 0547548 A1 | 6/1993 |
| EP | 2565582 A1 | 3/2013 |
| JP | H09152351 A | 6/1997 |
| JP | H11001133 A | 6/1999 |
| JP | 2008275621 A | 11/2008 |
| JP | 2012510647 A | 5/2012 |
| WO | 2008053240 A1 | 5/2008 |
| WO | 2010063508 A1 | 6/2010 |
| WO | 2012034581 A1 | 3/2012 |

OTHER PUBLICATIONS

United Kingdom Search Report dated Mar. 7, 2014 of United Kingdom Application No. GB1316013.0.

* cited by examiner

METHODS AND SYSTEMS FOR GENERATING ALTERNATIVE ROUTES

CROSS-REFERENCES TO RELATED APPLICATIONS

This application is the National Stage of International Application No. PCT/EP2014/069187, filed Sep. 9, 2014, and designating the United States. The application claims priority from United Kingdom Patent Application No. 1316013.0 filed Sep. 9, 2013. The entire content of these applications is incorporated herein by reference.

FIELD OF THE INVENTION

This invention relates to methods and systems for generating alternative routes, and also extends to navigation devices and servers arranged to generate alternative routes. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning functionality, and preferably also navigation functionality. Further aspects of the invention relate to the generation of routes in general.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route. In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

When navigating along a route, or planning a route, users may be presented with alternative routes between an origin and destination by a navigation device, or other system having route generating functionality. Rather than simply providing the user with a single route optimised with respect to time, distance or another criterion such as fuel economy, this provides the user with the opportunity to decide which of a number of possible routes they prefer for some reason. These routes would typically not be optimised with respect to the given criterion, e.g. time, but might be preferable to a user for another reason, e.g. in that they avoid a particular junction or stretch of road that the user dislikes, are more scenic, etc. A system for presenting a user with alternative route options is described in the Applicant's co-pending application entitled "Navigation Device with Alternative Navigation Instructions", published as WO 2012/034581 A1; the entire contents of which is incorporated herein by reference.

Generating and selecting alternative routes which are sensible routes a user might wish to use presents some challenges. It will be appreciated that numerous routes could theoretically be provided which differ in some respect from a first, e.g. fastest, route. In particular, in order to provide more useful alternative routes that are more likely to be helpful to a user, it is desirable for the alternative routes to differ to an appropriate degree from the first, e.g. fastest, route. The present invention is directed to methods and systems for generating such alternative routes that differ appropriately from a first route.

SUMMARY OF THE INVENTION

In accordance with a first aspect of the invention there is provided a method of generating routes in an area covered by an electronic map, the map comprising a plurality of segments representing navigable segments of a navigable network in the area covered by the electronic map, the method comprising:

obtaining a first route between a first location and a second location in the area;

defining a central portion of the first route, wherein the central portion has an extent along the first route that is determined based on a distance between the first location and the second location, wherein the relative extent of the central portion along the first route is inversely related to the distance between the first location and the second location;

identifying one or more navigable segments forming the defined central portion along the first route;

penalising the or each identified navigable segment of the central portion for the purpose of route generation through the navigable network by making the or each navigable segment less favourable for inclusion in a route generated through the navigable network; and generating an alternative route through the navigable network between the first location and the second location.

In accordance with the invention, therefore, a first route is obtained between a first location and a second location. A central portion is then defined along the first route. The central portion has an extent along the first route that is determined by reference to a distance between the first location and the second location, with the relative extent of the central portion along the first route being inversely related to the distance between the first and second locations. One or more navigable segments identified as forming part of the central portion are penalised, such that the segments will be treated less favourably when a route is generated through the navigable network. An alternative route is then generated. The generation of the alternative route will take into account the penalty applied to the or each identified navigable segment of the central portion.

As those segments that define the central portion of the first route are penalised for the purposes of generating the alternative route, the alternative route will be "pushed" away from the central portion of the first route. As the distance between the first and second locations increases, so the relative extent of the central portion along the first route decreases. Thus, the proportion of the first route whose navigable segments are penalised to make them less favourable in alternative route generation is dependent upon the distance between the first and second locations, such that a greater proportion of the first route will be penalised for shorter distances between the first and second locations than is penalised for longer such distances. The distance between the first and second locations is a measure of the length of the first route. Thus, for longer first routes, the alternative routes generated may be more similar to the first route than would be the case for shorter first routes.

The present invention thus recognises that while drivers desire alternative routes that are substantially different to a first route for shorter first routes, for longer first routes, on the other hand, a useful alternative route need not differ to the same extent from the first route. By way of example, when travelling longer distances, where the first route involves the use of a highway, a driver may not be interested in an alternative route that avoids the highway, but instead a route that diverges from the first route subsequent to a certain portion of the highway. In accordance with the invention, rather than blocking the segments of the central portion of the first route so that they may not form part of an alternative route, the segments are merely penalised in subsequent alternative route generation, by making them less favourable in route determination. This may result in a more stable alternative routing algorithm in use.

It will be appreciated that the first route may be considered as the "main" route, i.e. the initial route, with the alternative route or routes being alternative to this first or "main" route. The "first" route may therefore be referred to as the "main route".

The present invention extends to a system for carrying out a method in accordance with any of the aspects or embodiments of the invention herein described.

In accordance with a second aspect of the invention there is provided a system for generating routes in an area covered by an electronic map, the map comprising a plurality of segments representing navigable segments of a navigable network in the area covered by the electronic map, the system comprising:

means for obtaining a first route between a first location and a second location in the area;

means for defining a central portion of the first route, wherein the central portion has an extent along the first route that is determined based on a distance between the first location and the second location, wherein the relative extent of the central portion along the first route is inversely related to the distance between the first location and the second location;

means for identifying one or more navigable segments forming the defined central portion along the first route;

means for penalising the or each identified navigable segment of the central portion for the purpose of route generation through the navigable network by making the or each navigable segment less favourable for inclusion in a route generated through the navigable network; and means for generating an alternative route through the navigable network between the first location and the second location.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

In general, the system of the present invention in any of its embodiments may be at least one processing device. The or a processing device may be a device of a mobile device, such as a navigation device, whether a PND or an integrated device, or may be a device of a server.

The method of the present invention is preferably implemented in the context of a navigation operation. Thus, the method is preferably carried out by a set of one or more processors of a device or system having navigation functionality. However, it will be appreciated that the methods may also be carried out by any suitable system having route generating capability, but not necessarily navigation functionality. For example, the methods may be implemented by a computer system, e.g. a desktop or laptop system, which does not have navigation functionality. A user may be presented with an alternative generated route which may then be printed or otherwise used to aid route selection at a subsequent time, or, for example, the routes may be stored for future use, e.g. downloading to a navigation device.

In preferred embodiments the method of the present invention in any of its aspects or embodiments is carried out using a navigation device, and the present invention extends to a navigation device arranged to carry out the steps of the method of any of the aspects or embodiments of the invention. The navigation device may be a portable navigation device (PND) or an integrated, e.g. in-vehicle, device.

In accordance with any of the aspects or embodiments of the invention the navigation device may comprise a display for displaying an electronic map to a user, a set of one or more processors configured to access digital map data and cause an electronic map to be displayed to a user via the display, and a user interface operable by a user to enable the user to interact with the device. Thus, the system of the present invention may be a system, e.g. processing device of a navigation device.

In other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a system, e.g. processing device of a server.

As will be appreciated by those skilled in the art, these further aspects of the present invention can and preferably do include any one or more or all of the preferred and optional features of the invention described herein in respect of any of the other aspects of the invention, as appropriate.

Of course, the steps of the method of the present invention in any of its aspects or embodiments may be carried out in part by a server and in part by a navigation apparatus. For example route generation may be carried out by a server, e.g. at the request of a navigation device, and provided to the device for output to a user. The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Thus, the system of the present invention may be provided in part by a navigation device or other mobile device, and in part by a server.

For example, the steps of obtaining, e.g. generating, the first route and generating the alternative route may be carried out by a navigation device. The navigation device might also determine the central portion of the first route. In other arrangements, one or both of the first route and the alternative route may be obtained or generated by the server. In yet another possibility, all steps might be performed by a server. Accordingly, any step or steps of the method may be performed on either one of a server or navigation device. A server or navigation device might be arranged to penalise the or each segment of the central portion in any suitable manner for use in generating the alternative route, and, if appropriate, may transmit data for use by the other part of the system in generating the alternative route.

The term "segment" as used herein takes its usual meaning in the art. A segment may be a navigable link that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments.

The method comprises the step of obtaining the first route between a first location and a second location. In some embodiments the first route corresponds to a route generated between an origin and a destination, wherein the first location and the second location correspond respectively to the origin and destination of the generated route. The method may comprise obtaining the first route by generating a route between an origin and a destination, wherein the first route corresponds to the generated route, the first and second locations being respectively the origin and destination of the generated route. These embodiments may be particularly applicable where the steps of the method, including the generation of the alternative route, are carried out before navigation along the first route occurs. The route may be generated in any suitable manner. The route is preferably generated based upon a cost of traversing navigable segments of the navigable network. The cost of traversing a navigable segment may be determined using a cost function. Suitable cost functions are known in the art. The cost of traversing a segment may be determined based upon one or more attributes associated with the segment. Preferably the first route is a least cost route between the first location and the second location. A least cost route may be based upon minimising a cost associated with traversing segments of the navigable network, which cost is determined using an appropriate cost function. For example, the cost function may be selected as appropriate, e.g. based upon user input, to result in a least cost route that is a shortest route, fastest route, most ecological route, etc.

It will be appreciated that a first route between an origin and location (corresponding to the first location and second location) may alternatively be generated during travel along another predetermined route. For example, the first route might be generated in relation to a first route origin which is located on a predetermined route being followed. The first route may then provide a continuation to the predetermined route, e.g. an extension of the predetermined route, or a modified remainder or section of the predetermined route which becomes a new route to be followed. In these situations the first route origin might be automatically selected. The first route origin may then be a position at or ahead of a current position along a predetermined route.

In other embodiments the first route may correspond to at least a portion of a remainder of a predetermined route being navigated. Preferably the first route corresponds to the remainder of the predetermined route being navigated, i.e. the entire remainder between a current position and destination of the route. The predetermined route is a route that has previously been generated. The predetermined route is a route generated between an origin and a destination. These embodiments are particularly applicable where the invention is implemented after navigation along a predetermined route has commenced i.e. to generate "en route" alternatives, as discussed below. The method may comprise obtaining the first route by identifying at least a portion of a remainder of a predetermined route that is being navigated. The first location is then a location along the predetermined route being navigated e.g. a current position or a position ahead of a current position. For example, the first location might be a position along the predetermined route that will be reached at a particular future time, or which corresponds to a decision point along the remainder of the predetermined route etc. Preferably the first location is the current position. The second location is preferably the destination of the predetermined route being navigated. However, this is not necessarily the case. The second location may be any location along the predetermined route beyond the first location in the direction of travel. It will be appreciated that the method may or may not extend to the step of generating the predetermined route that is being navigated. The method may extend to the step of generating a route between an origin and a destination to provide the predetermined route that is being navigated prior to the step of obtaining the first route. The method may comprise generating a route between an origin and a destination, and, after navigation along the route has commenced, obtaining the first route by identifying at least a portion of a remainder of the route being navigated. The route may be generated in any of the manners discussed above in relation to embodiments in which the first route is generated, e.g. by being a least cost route, etc.

Regardless of whether the first route is a route generated between an origin and destination, or a remainder of a predetermined route, or otherwise, preferably the first route is a least cost route. In these embodiments the route is a route that is determined to minimise a cost function based on one or more attributes associated with the navigable elements of the network.

The first and second locations, and, in some embodiments, the first route, where the method does not extend to generating the first route, may be obtained from any suitable source or sources. The first and second locations may be selected as desired, and may be user specified or automatically selected, or combinations thereof. For example, the first location, second location and/or first route may be received over a communications network. For example, the method may comprise receiving data indicative of a remainder of a predetermined route that is being navigated, and which is to provide the first route. A server might receive such data from a navigation device or vice versa. Regardless of how the first route is obtained, i.e. whether it is generated or determined from a predetermined route, the first location and second location may be received over a communications network. The first location and second location may be transmitted between any components of the network. Again, it is envisaged that the first route origin and destination could be received by a server from a navigation device, or may be received by a navigation device from a server. In some embodiments the first location and/or the second location may be input by a user. The first location and/or the second location may be input to a navigation device or server by a user. These arrangements may be particularly applicable where the first and second locations correspond to an origin and destination of a generated route. It will be appreciated that only the second location may be user specified, e.g. if it corresponds to the destination of a remainder of a predetermined route being navigated that was generated between a user specified origin and destination.

The step of generating the alternative route may be implemented at any stage, and may be implemented before or during navigation along a predetermined route. For example, the alternative route may be generated together with the first route at the start of a route planning operation by a navigation device or other route planning system. In these embodiments the first location and the second location may be, respectively, an origin and destination of the first route. A user may then decide whether to follow the or an alternative route once navigation commences in preference to the first generated route.

As set out above, the present invention is not limited to an implementation by a system that has navigation capability, and the alternative route may be generated by a route generation system for evaluation by a user, such that the routes might be used subsequently in a navigation operation, or might simply be reviewed by the user without being then used in route navigation. The user might, for example, print or save the route for later use.

However, the present invention is advantageously implemented on the fly'. In these embodiments the alternative route may be referred to as an "en route alternative route". For example, alternative route generation might be initiated if it is determined that a predetermined route being navigated is affected by traffic ahead. Thus, in preferred embodiments the alternative route is generated on the fly and/or during navigation along a predetermined route. The first route may then be a remainder of the predetermined route being navigated.

A user may decide for numerous reasons that they would like to see if other suitable alternative routes exist after travel along a route has commenced. The generation of the alternative route may occur automatically or in response to a user input. The alternative route may be generated automatically in relation to a decision point or points along a predetermined route being navigated. In these embodiments, the route is generated automatically as a background task during navigation along a predetermined route, in a similar manner to that in which new "fastest" routes are generated in conventional systems during navigation along a predetermined route.

The first route is a route that it is desired to obtain an alternative to for any reason, whether automatically or in response to a user request. The first route has a length as measured along the first route defined between the first and second locations. Thus the first and second locations correspond to first and second ends of the first route respectively. As described in more detail below, it will be appreciated that the first and second locations may correspond to the origin and destination of a generated route which provides the first route. In other embodiments, in which the first route is at least a portion of the remainder of a predetermined route generated between an origin and destination, the first location may instead correspond to a current position, defining the start of the remainder of the route, or a position ahead of the current position. The second location may then correspond to the destination of the predetermined generated route. It is envisaged that the second location might not necessarily correspond to a destination of a predetermined route in cases in which the first route is a remainder of a predetermined route. It may be desired that the alternative route is only provided in relation to a portion of the remainder of the predetermined route. However, preferably the first location corresponds to the current position along the predetermined route, and the second location to the destination of the predetermined route.

In accordance with the invention a central portion of the first route is defined. The central portion is "central" in relation to its position along the length of the first route between the first location and second location. The central portion extends longitudinally over only a central portion of the length of the first route.

In accordance with the invention the extent of the central portion along the first route, i.e. along the length thereof, is determined based on a distance between the first and second locations, wherein the relative extent of the central portion along the first route is inversely related to the distance between the first and second locations. The relative extent refers to the extent of the central portion relative to the extent of the first route. The extents are longitudinal extents. The extent of the central portion along the first route is a length of the central portion along the first route, and the relative extent of the central portion refers to the length of the central portion relative to the length of the first route along the first route. In other words, the proportion of the first route over which the central portion extends is inversely related to the distance between the first and second locations. The term "inversely related" herein means that the relative extent determined for a central portion will decrease as the distance between the first and second locations increases and vice versa.

The extent of the central portion may be determined in any manner using the distance between the first and second locations that results in the relative extent of the central portion along the first route being inversely related to the distance between the first and second locations. The extent of the central portion may be determined using a function in which the relative extent of the central portion determined is inversely related to the distance between the first and second locations. For example the relative extent of the central portion may be obtained using a function such that the determined relative extent is related to a reciprocal of the distance between the first and second locations. The method may comprise inputting distance between the first and second locations into a function that operates on the distance between the first and second locations to provide an output that is the relative extent of the central portion along a first route for that distance, the function being arranged to provide an output relative extent for the central portion of any input distance between first and second locations between which a first route extends that is inversely related to the distance between the first and second locations.

The method may comprise determining a percentage of the length of the first route over which the central portion is to extend. The determined percentage is inversely related to the distance between the first and second locations.

The distance between the first and second locations used in determining the relative extent of the central portion along the first route may be any measure of the distance between the first and second locations. Preferably the distance between the first and second locations used in the determination of the relative extent of the central portion is the distance as measured along the first route between the first and second locations. However, it is envisaged that a straight line distance between the first and second locations may alternatively be used. Both measures of the distance between the first and second locations will allow a relative extent of the central portion to be determined that is inversely related to the distance between the locations.

In preferred embodiments the method comprises identifying a central point along the length of the first route between the first location and second location, and the central portion extends equally in both directions from the central portion until it is of a desired extent. The central point of the first route is equidistant from the first location and second location along the route. The start point and end point of the central portion are preferably equidistant from the central point of the first route along the route.

In accordance with the invention the method comprises identifying one or more navigable segments of the navigable network forming the defined central portion along the first route. These are the navigable segments which are penalised for the purposes of generating the alternative route in accordance with the invention. Those navigable segments which are considered to "form" the central portion will include those navigable segments which are wholly included in the central portion. However, it will be appreciated that the start and end points of the central portion along the first route may not necessarily correspond to end points of navigable segments, such that only a portion of some navigable segments may be included in the central region. Where only a portion of a navigable segment is included in the central portion, a decision may be made as to whether to consider the segment as being a segment forming the central portion. For example, only segments that are fully within the central portion may be considered to form the central portion, or all segments with at least a portion being within the central position, or only those segments having a portion greater than a particular threshold in the central region may be included, etc.

In accordance with the invention, the or each identified navigable segment of the central portion is penalised for the purposes of route generation through the navigable network by making the segment less favourable for inclusion in a route generated through the navigable network. The or each identified navigable segment is therefore penalised in the generation of the alternative route through the navigable network.

The or each navigable segment may be penalised in any suitable manner for the purposes of route generation through the navigable network so that when the alternative route is generated, the or each segment is considered less favourable for inclusion, i.e. than it would otherwise be. The or each identified navigable segment may be penalised by applying a penalty thereto to make the segment less favourable for inclusion in a route through the navigable network. The alternative route generated takes into account the penalised navigable segment(s), i.e. the penalty applied to the or each identified navigable segment. The penalty applied to the or each identified navigable segment for the purposes of route generation as a result of its forming part of the central portion is over and above any penalty that would otherwise be applied to that segment. The method comprises penalising, e.g. applying a penalty to the or each identified navigable segment and not to navigable segments which are not identified as forming part of the central portion of the first route. In embodiments the method comprises penalising only the or each identified navigable segment, e.g. applying a penalty only to the or each identified navigable segment.

Preferably the alternative route generated through the navigable network between the first and second locations is based upon a cost of traversing navigable segments of the navigable network. The method may then comprise penalising the or each identified navigable segment for the purposes of route generation by applying a cost penalty to the or each navigable segment. In these embodiments the or each identified navigable segment is assigned a cost for the purposes of route generation that includes a cost penalty as a result of the segment forming part of the central portion. The cost penalty results in the segment being considered less favourably than would otherwise be the case when a route, e.g. the alternative route, is generated through the navigable network. In some embodiments penalising of the or each identified navigable segment results in the or each navigable segment being penalised relative to other navigable segments of the navigable network that do not form part of the central portion. The or each identified segment may be associated with a less favourable, e.g. greater traversal cost relative to other segments which do not form part of the central portion in route determination. The navigable segment(s) of the recommended navigable stretch may become less favourable than any other navigable segment of the navigable network that does not form a part of the central portion. However, it is envisaged that even after taking the cost penalty into account, an identified navigable segment may still form part of a generated alternative route. For example, the cost associated with traversing the segment attributable to other factors, e.g. based upon an attribute or attributes of the segments considered in route generation, may be such that even taking into account the cost penalty applied to the segment, the segment has a traversal cost that is more advantageous than that of other candidate segments.

The method may comprise applying a cost penalty to the or each identified navigable segment that modifies the cost of traversing the segment, i.e. relative to the cost that would otherwise be assigned to the segment. Typically, the higher the cost associated with a navigable segment, the less favourable the segment will be in route generation. Route generation will often seek to provide a least cost route through the navigable network. In embodiments the step of penalising the or each identified navigable segment by assigning a cost penalty thereto comprises assigning the or each navigable segment a higher cost than would otherwise be assigned to the navigable segment. In this way, the cost assigned to the or each identified navigable segment incorporates a component that is attributable to the fact that the segment forms part of the central region. A cost penalty may be provided by, for example, adding a further cost component to those segments identified as forming part of the central portion, or applying a scaling factor to the cost otherwise determined for the or each identified segment(s), etc. The term "cost penalty" as used herein refers to the cost being adjusted as a result of the segment forming part of the central portion to make the segment less favourable for route generation than it would otherwise be. Of course, while the invention is described in relation to preferred embodiments in which a higher cost corresponds to a segment being less favourable, the method could equally be applied to situations in which a lower cost corresponded to the segment being less favourable. The cost assigned to the or each identified navigable segment may be selected as appropriate to penalise the segment for the purposes of route generation, so as to make the segment less favourable for inclusion in a route, taking into account the operation of a particular routing engine used. The routing engine may provide a route optimised as to cost, which is preferably a least cost route.

The cost associated with traversing a navigable segment may be determined using a cost function. In embodiments a cost penalty may be applied to the or each identified navigable segment using the cost function. For example, the method may comprise determining a cost associated with traversing navigable segments of the navigable network using a cost function that is arranged to apply a cost penalty to the or each identified navigable segment (e.g. only to the or each identified navigable segment) as a result of their forming part of the central region. Of course, other arrangements for applying the cost penalty to the or each identified navigable segment may be used, and this need not be achieved using the cost function. For example, the penalty might be applied after application of a cost function to the or each identified navigable segment by weighting the cost determined for the or each identified navigable segment when generating the alternative route appropriately.

In embodiments each navigable segment of the navigable network has attribute data representative of one or more attributes associated therewith. The cost of traversing a navigable segment is based at least in part on the attribute data associated with the navigable segment. The cost may take into account any or all of the attribute data associated with a navigable segment. This will depend upon a particular cost function that is used. The cost function used will, in turn, depend upon the operation of the routing engine, and the attributes desired for generated routes. A cost function may take into account any one or ones of the attributes of navigable segments, and apply any desired relative weighting to those attributes when assigning a cost to the segment for use in route generation.

It will be appreciated that the penalising of the or each identified navigable segment carried out in accordance with the invention is over and above any penalty that might otherwise result from the attribute(s) associated with the segment. The penalty is attributable to the navigable element(s) forming part of the central portion of the first route, and is therefore assigned only to the identified navigable element(s). In embodiments the method may comprise determining a cost associated with traversing navigable segments of the navigable network based upon the attribute data associated with the navigable segments, e.g. using a cost function, and penalising the or each identified navigable segment by applying a cost penalty thereto so that the or each navigable segment is associated with a different, and preferably higher, cost than would be determined based upon the attribute data associated with the segment. The cost of traversing the or each identified navigable segment may comprise a first component based upon one or more attributes of the segment, and a second component comprising the applied cost penalty.

In some arrangements, it is envisaged that the or each identified navigable segment could be penalised in accordance with the invention by modifying the attribute data associated with the or each segment, so that the or each segment will be less favourable for inclusion in a route. Thus, rather than directly applying a cost penalty to the or each identified navigable segment using an appropriate cost function, a cost penalty for traversing a navigable segment may be applied indirectly through modifying the attribute data for the segment.

The method may comprise determining modified attribute data for the or each identified navigable segment of the central portion of the first route, wherein the modified attribute data is determined to penalise the navigable segment so as to make the segment less favourable when a route is generated through the navigable network using the attribute data associated with the navigable segments; and generating the alternative route between the first location and second location using the modified attribute data.

In these embodiments, the attribute or attributes associated with the or each segment for which modified attribute data is determined in accordance with the invention may be any one or ones of the attributes associated with the or each segment which, when modified in accordance with the invention, will result in the or each segment being less favourably treated when considered in relation to generating a route through the navigable network comprising the segment(s). Thus the attribute(s) are attribute(s) that are considered by a routing engine in generating a route. In some preferred embodiments only one attribute associated with a segment is modified, although it is envisaged that any combination of attributes may be modified provided that this results in the segment being penalised so as to be considered less favourable when a route is generated.

The attribute or attributes which are modified will depend upon those attribute(s) which are considered for the purposes of routing, e.g. by a routing engine of the system (which may be a navigation device or a server), such as in generating a least cost route across the network of navigable segments. In one exemplary arrangement, the or an attribute that is modified may be a flow speed for the or each identified segment, e.g. an expected speed of travel along the segment. There are numerous other attributes that can, alternatively, or additionally, be modified, to result in a segment being less favourably treated in route generation, and which may be modified in accordance with the invention. Examples include traversal time for the segment, segment length, carbon emission quantity for traversing the segment or fuel consumption for traversing the segment. Any of these attributes may be used in determining a cost associated with the segment for use in generating a route by reference to the cost, e.g. a least cost path, depending upon the settings of the routing engine. For example, a user may be able to specify that they wish routes to be generated that minimise one or more of travel time, length, carbon emission level or fuel consumption, in addition to, or alternatively to, estimated time of arrival. A routing engine may be arranged to balance a range of different attributes, e.g. using a cost function, when determining a route, which may or may not include user specified attributes.

Regardless of how the or each identified navigable segment is penalised, the penalising of the or each identified navigable segment results in the or each navigable segment being penalised for the purpose of route generation through the navigable network. Preferably the or each identified navigable segment is penalised such that the segment will be less favourable for inclusion in a route through the network that is generated based upon a determined cost of traversing navigable segments of the network. The alternative route may then be generated taking into account the penalty applied to the or each identified navigable segment. The method preferably comprises generating the alternative route through the network of navigable segments based on a determined cost of traversing each segment. Preferably the method comprises generating an alternative route that is optimised as to cost, and preferably which is a least cost path through the navigable network. Thus the alternative route that is generated is then an optimum route for a given cost function used in the routing determination, taking into account the penalty applied to the one or more identified navigable segments which form the central portion of the first route. The system, e.g. a server or navigation device, may comprise a routing engine that is arranged to operate in accordance with any of the embodiments described.

It will be appreciated that each navigable segment of the navigable network may or may not be taken into account when generating a route, e.g. the alternative route. For example, a routing engine may consider only certain navigable segments, e.g. forming part of a routing corridor, etc. Thus, the or each identified navigable segment is penalised in comparison to those other navigable segments that are taken into account, and the step of generating a route may be based upon a cost of traversing navigable segments of the navigable network, which may or may not be a subset of the navigable segments of the network.

In some preferred embodiments of the invention the method comprises penalising the or each identified navigable segment of the central portion to an extent that is inversely related to the distance between the first and second locations. In other words, for longer first routes, the degree to which the navigable segments of the central portion are penalised will be less than would be the case for a shorter first route. This feature has the effect of more strongly "pushing" alternative generated routes away from the central portion of the first route for shorter routes.

The step of penalising the or each identified navigable segment may occur before or as part or the step of generating the alternative route.

It will be appreciated that in accordance with the present invention in any of its aspects or embodiments, once a (first) alternative route has been generated, the steps of the invention may be repeated using the generated alternative route in place of the first route to obtain a further alternative route, i.e. an alternative to the first generated alternative route, and so on. The or each further alternative route may be output, stored or displayed in any of the manners described herein. When repeating the steps of the method in these embodiments, the relative extent of the central portion of the alternative route is again determined by reference to the distance between the first and second locations. This may be measured by reference to the length of the first route or the (first) alternative route along the relevant route, or could be by reference to a straight line distance between the first and second locations.

Thus, the method may further comprise:

defining a central portion of the generated alternative route, wherein the central portion has an extent along the alternative route that is determined by reference to the distance between the first and second locations, wherein the relative extent of the central portion along the alternative route is inversely related to the distance between the first and second locations;

identifying one or more navigable segments forming the defined central portion along the alternative route;

penalising the or each identified navigable segment of the central portion along the alternative route for the purpose of route generation through the navigable network by making the or each navigable segment less favourable for inclusion in a route through the navigable network; and generating a further alternative route through the navigable network between the first location and the second location.

In this further embodiment, the steps performed in relation to the (first) alternative route, i.e. the alternative to the first route, to provide the further alternative route may be in accordance with any of the embodiments described in relation to the first route above. Thus any of the steps or features described in relation to generating the (first) alternative route may be used in conjunction with generating a further alternative route. The central portion of the alternative route may be defined in any of the manners described above in relation to the first route.

Of course, yet further alternative routes may then be generated in a similar manner. In each case a generated alternative route may be used to provide the route in relation to which a central portion is defined, whose navigable segments are penalised and an alternative route generated. The extent of the central portion may be determined using the distance between the first and second locations as measured in a straight line, or along the first route, first alternative route or any previously generated further alternative route.

Once an alternative route is generated, whether a first alternative route, or a further alternative route obtained as described above based on an earlier generated alternative route, it may be used without further testing, e.g. being output to a user or similar as described below. However, in other embodiments, a generated alternative route may be considered to be a candidate alternative route that is subjected to further testing before it is deemed an acceptable alternative route.

The method may comprise determining whether a generated alternative route (whether a first alternative route or a further alternative route) is an acceptable alternative route by assessing the similarity of the generated alternative route to the first route. The assessment is preferably carried out by reference to a proportion of the alternative route that is shared with the first route. For example, a length fraction of shared route parts may be determined. The method may comprise determining whether or not the alternative route is acceptable using the results of the assessment. In general, it is desirable that an alternative route is not too similar to the first route. The step of determining whether an alternative route is acceptable may be carried out as appropriate, e.g. by comparing the proportion of the route that is shared with the first route to a threshold or similar. An alternative route may be deemed acceptable when a similarity of the route to the first route is below a given threshold, e.g. by reference to the proportion of the alternative route that is shared with the first route. Thus, in some embodiments the method comprises determining that the alternative route is not acceptable when the proportion of the alternative route that is shared with the first route exceeds a predetermined threshold. A threshold may be set as desired, depending upon the degree of route similarity that can be tolerated.

The method may comprise further penalising the or each identified navigable segment if the generated alternative route is deemed not to be acceptable as being too similar to the first route to further penalise the or each segment so as to make the or each segment even less favourable when a route is generated through the navigable network (taking into account the penalty applied to the segment(s)). The method may comprise generating another alternative route between the first location and second location once the or each identified navigable segment has been further penalised. Thus the initial alternative route may be referred to as the first alternative route.

Of course, the same steps may be repeated with the another generated route. Thus, the similarity of the another alternative generated route to the first route may be assessed, and if it is deemed unacceptable as being be too similar, the identified segment or segments may be further penalised so as to make the or each segment still less favourable in route generation, and yet another alternative route generated. This process of assessing the similarity of a generated route to the first route, further penalising segments of the central portion of the first route if the route is deemed not to be acceptable as being too similar to the first route, and generating another alternative route, may be repeated up to a predetermined number of attempts, with the penalty applied to the identified segment(s) of the central portion being further increased at each attempt, until an acceptable alternative route is generated. If no alternative route is generated that is deemed acceptable by that time, it may be determined that no suitable alternative route may be found. A suitable output may be made to a user to inform them of the failure of the alternative route generation process, i.e. stating that no suitable alternative route has been found.

Where generated alternative routes are assessed for acceptability e.g. by reference to similarity to the first route, information relating to a route may only be output once such a test has been passed i.e. only acceptable routes are output in any of the manners described.

The method may comprise outputting the or a generated alternative route (e.g. a first alternative route where multiple routes are generated, or any further alternative route, that, in embodiments, has been deemed acceptable). In preferred embodiments the method further comprises providing information indicative of the generated alternative route to a user. This may involve outputting the route or information indicative thereof to a user. The information may be in any way indicative of the route, e.g. a set of instructions, which may be audible or visual, but preferably is a visual representation of the route. In preferred embodiments, the method comprises displaying the route to a user. However other forms of output may be used. For example the method may alternatively or additionally comprise printing information indicative of the route. Preferably the information indicative of the route is output to a user via a navigation device, but in other embodiments the information may be output by any suitable processing device, e.g. by being displayed by a computer apparatus having route generating capability but not necessarily navigation capability, etc. This may be relevant where the route is generated by a server. In preferred embodiments, regardless of whether the at least one alternative route is generated by a navigation device such as a PND or integrated, e.g. in-vehicle, navigation device, the information indicative of the route(s) is output to the user by such a device. For example, the generation of the route may be carried out by a remote server and information indicative thereof provided to a navigation device for output to a user. In preferred embodiments, wherever the route is generated, a step of displaying the route may comprise superposing the or each route on the electronic map. This provides time for the user to decide whether to follow the route. The current position of the user may correspond to a current position determined by a navigation device, e.g. a portable (or mobile) device or integrated device, associated with the user, e.g. being located in a vehicle of the user.

Preferably the method further comprises providing information indicative of the first route to a user. This may be carried out in any of the manners described by reference to the or an alternative route. In embodiments the method comprises outputting, e.g. displaying the first route to the user, and preferably also the or an alternative route, preferably wherein the first and the alternative route are output, e.g. displayed simultaneously to a user, e.g. by displaying the routes together on the electronic map.

The method may further comprise providing a set of navigation instructions for guiding a user along the or an alternative route. The instructions may be visual, audible or haptic instructions, or combinations thereof as known in the art. This applies to any reference to navigation instructions herein. The route is preferably a user selected route. The navigation instructions may be provided to a user via a navigation apparatus, or may be otherwise output to the user, e.g. by a computer apparatus which provides route generation functionality displaying the instructions, or printing the instructions, etc. The instructions may be provided in response to a user selection of an alternative route.

In embodiments, the method may further comprise receiving an indication of a selection of the or an alternative route from a user. The selection may be indicative that the user wishes to navigate the selected route. For example, the user may select the or an alternative route via a suitable user interface, e.g. of a navigation apparatus, or associated with a computing apparatus providing route generating functionality. If only one alternative route is provided, the user may still specify that they wish to use the alternative route rather than the first route. Of course, when presented with the alternative route(s), the user may decide nonetheless to use the first route. However, the present invention provides the user with the opportunity to reassure themselves that they have considered alternative options and made a positive decision to use the first generated route. Exemplary methods of presenting alternative routes to a user can be found in WO 2012/034581 A1 mentioned above.

Preferably the alternative route(s) are generated automatically, i.e. without user intervention.

It will be appreciated that the method of the invention in any of its aspects or embodiments may be repeated for one or more further routes between locations in the area covered by the electronic map. The further routes are further input routes, i.e. further to the first route.

References to a predetermined route being navigated may be understood in the usual sense in the art to refer to a route along which a user is being guided, e.g. by a navigation device, and preferably in relation to which navigation instruction(s) are being provided. These may be in the form of a display of the route, typically in combination with a set of one or more instructions indicative of, e.g. manoeuvres and other action to be taken by the user to follow the route, which may be given audibly and/or visually. The predetermined route refers to the route being travelled at the time the alternative routes are generated or at least provided to a user.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE FIGURES

Embodiments of the invention will now be described, by way of example only, with reference to the accompanying Figures, in which.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
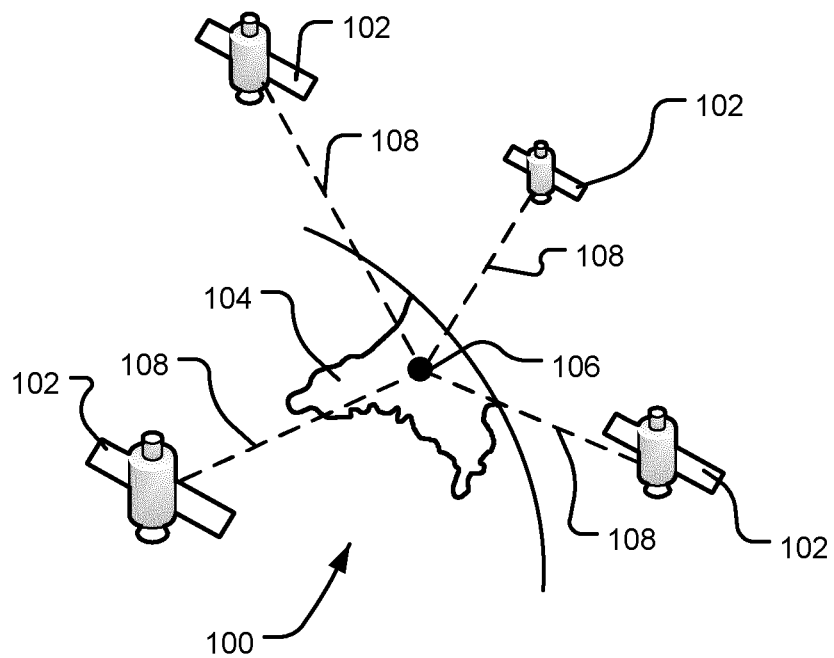
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
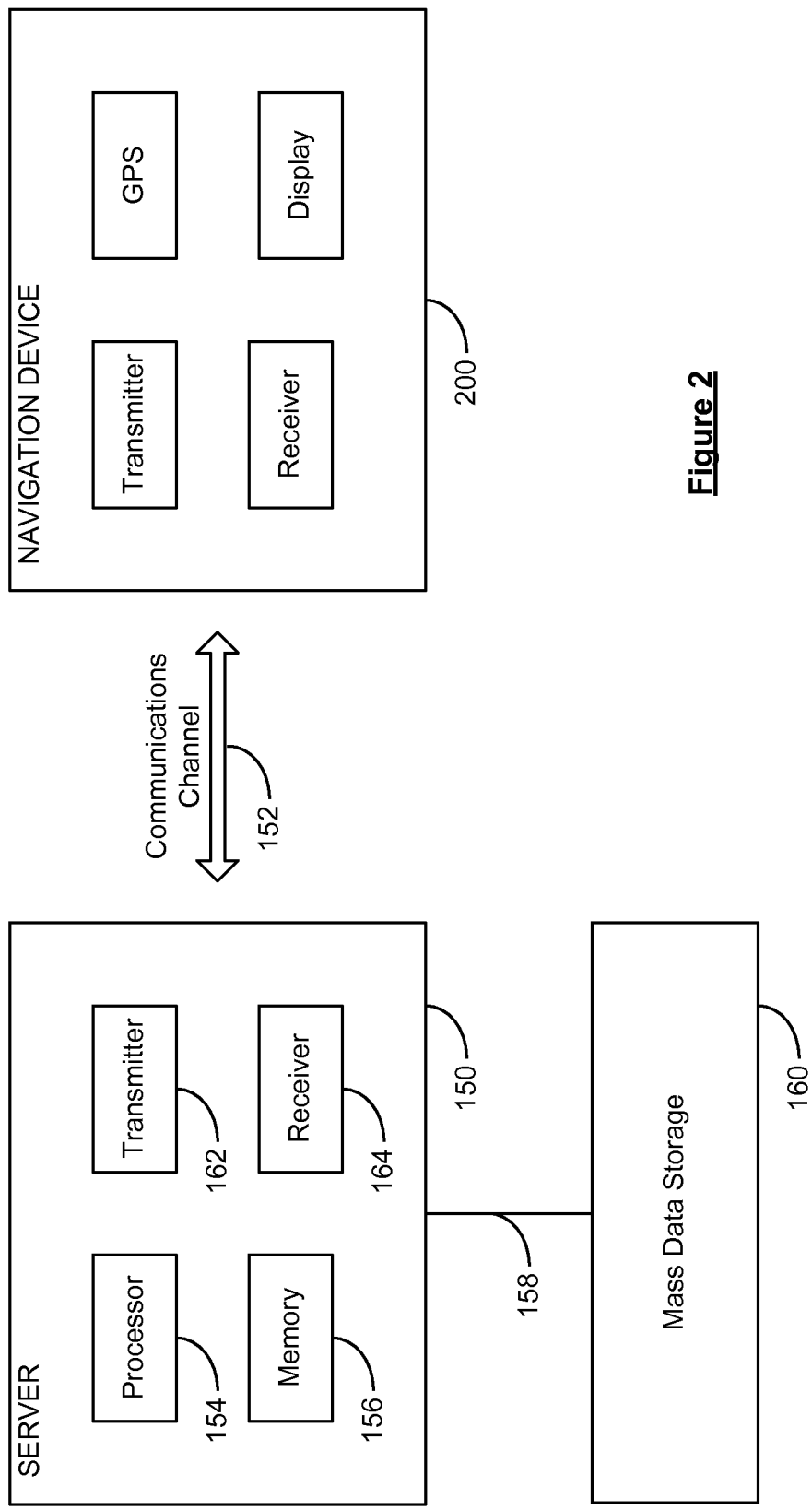
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
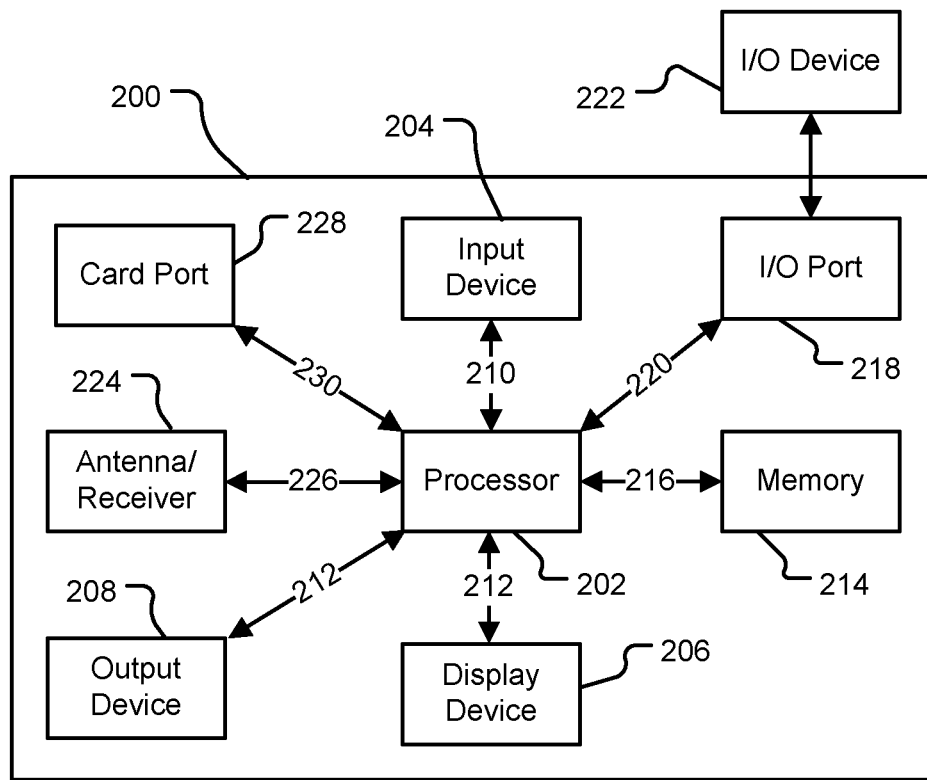
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like). FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
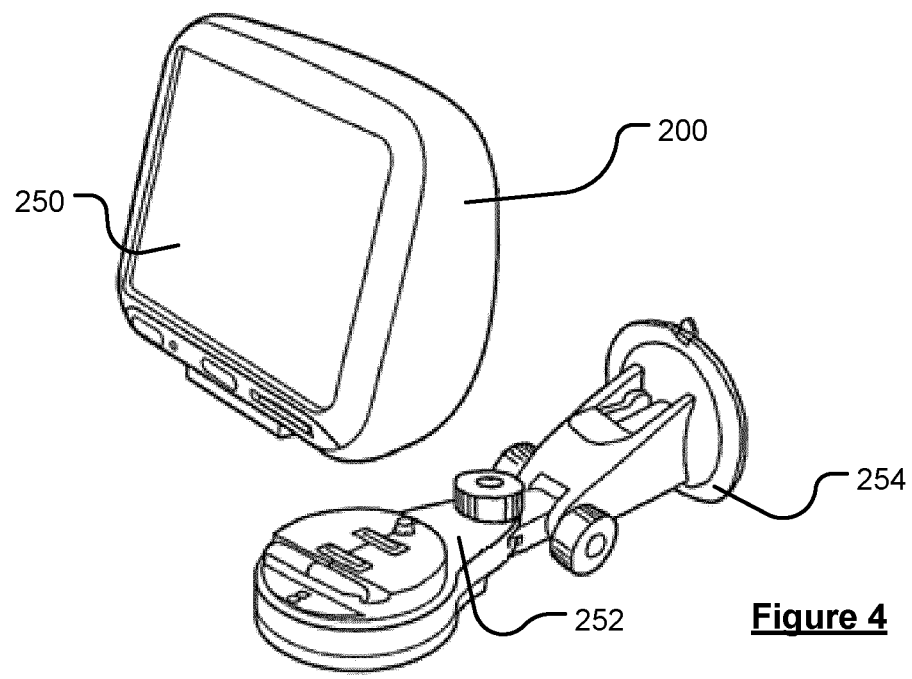
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time. In some embodiments, it may be found that the quality of the captured data reduces as the period increases and whilst the degree of degradation will at least in part be dependent upon the speed at which the navigation device 200 was moving a period of roughly 15 seconds may provide a suitable upper limit. Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

An embodiment of the invention will now be described by reference to FIGS. 5 and 6. The steps of this method may be performed by a navigation device e.g. a portable navigation device (PND), a server, or a combination thereof.

Figure 5:
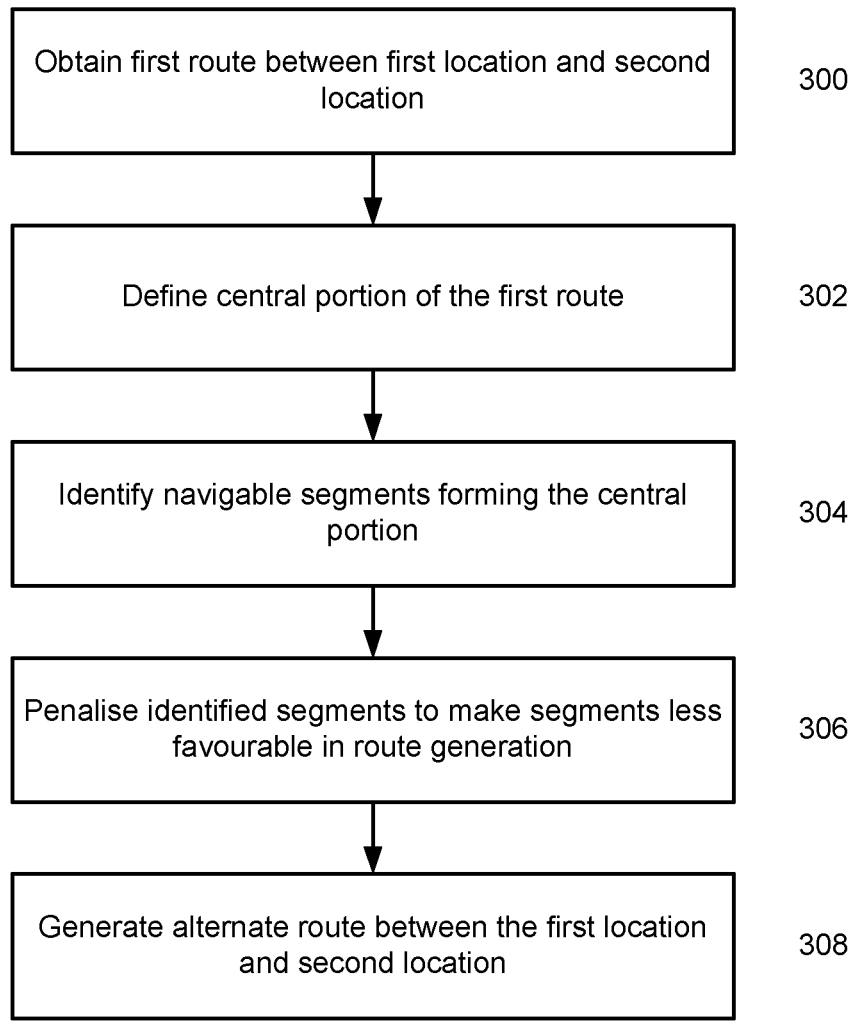
FIG. 5 is a flowchart illustrating the steps of a method in accordance with one embodiment of the invention.

In accordance with one embodiment of the method of the invention, which is set out in FIG. 5, a first route extending between a first location and a second location is obtained (step 300). The route is a route in an area covered by an electronic map which has a plurality of segments representing navigable segments of a navigable network in the area covered by the electronic map, each having attribute data representative of one or more attributes associated therewith. For example, attribute data may be indicative of flow speed for a segment, a length of a segment, curvature of the segment, gradient, fuel consumption for traversing the segment, expected time to traverse the segment for a given time period, etc as known in the art. Each segment may be associated with data indicative of one or more attributes.

Figure 6:
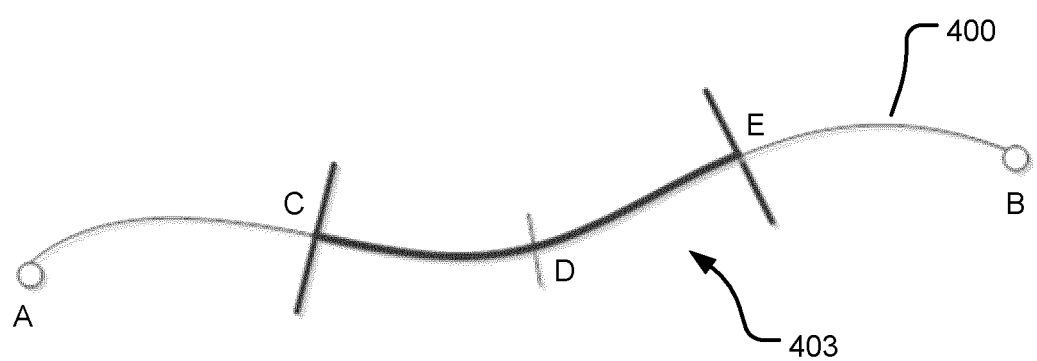
FIG. 6 illustrates the way in which a central portion of a first route may be defined.

An exemplary first route 400 is shown in FIG. 6. The first route 400 extends between a first location A and a second location B. This first route is the "main" route, in relation to which an alternative is desired to be found.

In one exemplary embodiment, in which an alternative route is generated during navigation along the predetermined route, the first route is the remainder of a predetermined route that is currently being navigated, with the first location A being a current location along the route, and the second location B being the destination of the predetermined route. Thus, the step of obtaining the first route involves obtaining information indicative of the remainder of the predetermined route being navigated. In these embodiments an "en route" alternative route may be provided. Initiation of alternative route generation in this case may be in response to a user input, or may be triggered automatically, e.g. to provide a user with other options for reaching their destination (or a location ahead of them).

In another exemplary embodiment, in which the alternative route is to be generated before navigation along a route occurs, e.g. such that a user may select whether to follow a main route or an alternative route before they set out, the step of obtaining the first route involves generating the first route 400 between the first location A, being the origin of the first route, and the second location B, being the destination of the route. The first route may be a least cost route generated by a routing engine as known in the art. The route may be generated using an appropriate cost function. The cost that is minimised in order to provide the route may be selected as appropriate such that the generated least cost route may be a fastest route, shortest route, most ecological route, etc.

In accordance with step 302, a central portion of the first route 400 is then defined. The central portion is centred about a central point D along the length of the first route 400 between the first location A and the second location B. The central portion has an extent along the first route 400 that is determined based upon a distance between the first location A and the second location B. The distance between A and B used in determining the extent of the central portion may be as measured along the first route, although it is envisaged that a straight line length between the first location A and the second location B could alternatively be used. The relative extent of the central portion along the length of the first route is inversely related to the distance between the first location A and the second location B. This may be achieved by selecting a percentage of the length of the first route 400 along which the central portion is to extend to be inversely proportional to the distance between A and B. The inverse relationship is such that as the distance between A and B, and hence the length of the first route, increases, the relative extent of the central portion along the first route decreases. Thus, for shorter first routes, the central portion will be defined to have a greater extent relative to the first route than would be the case for longer first routes. The distance between A and B may be input into a function for providing the relative extent of the central portion for that distance, e.g. as a percentage of the length of a first route extending between A and B, with the function defining an inverse relationship between the distance between A and B and the determined relative extent.

FIG. 6 illustrates the central portion 403 which is defined for the first route 400. The central portion 403 is shown as the bold section of the first route 400. The central portion 403 is defined between the points C and E, which are equidistant from the central point D of the first route 400, such that the central portion is centred on the central point D. The length of the central portion 403 between the points C and E is such that the central portion 403 extends along a percentage of the first route 400 that has been determined using distance between A and B, with the relative extent of the central portion 403 along the first route being inversely related to the distance between A and B. If distance between A and B had been longer, the relative extent of the central portion 3 along the route would have been smaller.

In accordance with step 304, those navigable segments which form the central portion of the first route 400 are identified. This will include those navigable segments wholly included in the central portion, and may or may not include any navigable segments that are only partially included in the central portion. A choice may be made in this regard to either include or exclude such segments, which may or may not involve consideration of the extent to which a segment is included in the region.

In accordance with step 306, a cost penalty is applied to the identified segments, so that the segments will be treated less favourably in a least cost route generation process based on the cost of traversing navigable segments of the navigable network than would otherwise be the case. The cost associated with traversing a navigable segment in the route generation process is determined using a cost function, and is based on at least some of the attribute(s) associated with the segment. The choice of attribute or attributes taken into account when determining the cost of traversing a segment will depend upon the operation of the routing engine used to determine the route, and, for example, upon its settings. Examples of attributes that may be taken into account include flow speed for a segment, traversal time for a segment, fuel consumption for the segment, curvature of a segment, length of the segment, etc. For example, where the routing engine determines a fastest route, by minimising travel time, the attribute might be a traversal time for the segment.

In accordance with the invention, a cost penalty is applied to the identified navigable segments by assigning the segment(s) a higher cost than would otherwise be determined for the segment(s) based on their attribute data. By applying a cost penalty to the segment(s) in this way, the segment(s) will be less favourably treated when a least cost route is generated through the navigable network. This may be achieved using the cost function.

In step 308, an alternative route is generated between the first location A and the second location B. This may be carried out by a routing engine, e.g. of a PND or server, which determines the alternative route using a cost function that determines a least cost route across the network of navigable segments. The determination of the route will be based upon the cost associated with traversing navigable segments of the network, and will therefore take into account the cost penalty applied to the identified navigable segment(s) in step 306 by virtue of their inclusion in the central region of the first route.

In this way, the route determination will tend to favour navigable segments that do not form part of the central portion 403 of the first route over those that do, pushing the alternative route generated away from the central portion of the first route. However, the segment(s) of the central portion are only penalised to make them less favoured for inclusion in the alternative route. They are not blocked so as to be completely prevented from inclusion in the route. It has been found that this can provide a more stable routing process. Furthermore, if it is otherwise associated with a lower cost, e.g. by virtue of its attributes, even after the cost penalty is applied, an identified navigable segment may still be more advantageous than an alternative segment that has not been penalised when the least cost alternative route is generated. The extent to which the modified attribute data penalises segments is advantageously chosen so as to be inversely related to the distance between the first and second locations A and B, so that the segments of the central portion are penalised to a greater extent for shorter routes and vice versa.

As the relative extent of the central portion is based upon the distance between A and B, e.g. on the length of the first route 400, the alternative route generated will be "pushed away" from a greater proportion of the length of a shorter route than a longer route, such that the resulting generated alternative route will be relatively more different to the initial first route for shorter routes than for longer routes. This recognises the fact that drivers would want an alternative route to differ more substantially from a shorter initial main route. For longer main routes it may be acceptable for the alternative route to correspond to the first route for a greater proportion of its length, e.g. to ensure that highway portions of the route are retained in the alternative.

Once an alternative route has been generated, its similarity to the first route 400 may be assessed by consideration of the length fraction of shared route parts. If the proportion of shared parts exceeds a given threshold, the generated alternative route may be deemed unacceptable as being too similar to the first route. Steps 306 and 308 may then be repeated, with the identified navigable elements of the central portion of the first route 400 being further penalised to make them even less favourable when route generation is conducted than was the case when they were first penalised. Another alternative route may then be generated. The effect of further penalising the segments of the central portion of the first route should more strongly push the generated alternative route away from the central portion of the first route, such that the resulting alternative route should differ more significantly to the first route than was the case with the initially generated alternative route.

The similarity of the further alternative generated route to the first route may then be assessed to determine whether it is acceptable. If it is not acceptable, then steps 306 and 308 may be repeated again, yet further penalising the segments of the central portion, and the resulting alternative route assessed for similarity to the first route. This cycle may be repeated until an acceptable alternative route is generated, differing to the necessary extent from the first route, or for a predetermined number of attempts if no acceptable alternative route is first found. In the latter case, the user may be informed that no alternative route could be found.

Once an alternative route has been found, if appropriate having been deemed "acceptable" if a similarity assessment is carried out, the route may be output to a user. The route may be displayed to a user, e.g. via a PND. This may allow the user to decide whether to select the alternative route or carry on with the first route. A set of navigation instructions may be generated for following the alternative route if it is to be followed. Alternatively or additionally, the alternative route may be stored.

The present invention is not limited to providing a single alternative route. Once an alternative route is provided in step 308, and, if appropriate, deemed acceptable following similarity assessment, a further alternative route may be generated. This method would involve repeating steps 302 to 308, but this time defining a central portion of the alternative route rather than the first route. This may be carried out in the same manner described in respect of the first route, with the extent of the central portion being based upon the distance between the first locations A and B once more, with the relative extent of the central portion then being inversely related to the distance between A and B. The distance between A and B may be measured as straight line distance, or along the first route or the first generated alternative route. The navigable segments forming part of the defined central portion of the alternative route are then penalised for the purposes of route generation as described in relation to the first route. A route is then generated through the network of navigable segments taking into account the penalties applied, e.g. a least cost route. This will result in a further alternative route being generated. This process may then be repeated again to generate another further alternative route, this time defining a central portion of the further alternative route based on the distance between the first and second locations A and B, however measured, and further penalising the identified segments of the central portion for the purposes of route generation, before generating the another further alternative route. This process may then be repeated any number of times if more alternative routes are desired. Any or all of the alternative routes generated may be output to a user.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of generating routes in an area covered by an electronic map, the map comprising a plurality of segments representing navigable segments of a navigable network in the area covered by the electronic map, the method comprising:
- obtaining, using a processor, a first route comprising a plurality of segments between a first location and a second location in the map;
- defining, using the processor, a central portion of the first route, wherein the central portion has an extent along the first route that is determined based on a distance between the first location and the second location, wherein a relative extent of the central portion along the first route is inversely related to the distance between the first location and the second location;
- identifying, using the processor, one or more navigable segments forming the defined central portion along the first route;
- generating, using the processor, an alternative route comprising a plurality of segments between the first location and the second location using a routing algorithm in which the one or more identified segments of the central portion of the first route are penalized, such that each of the one or more identified segments are less favorable for inclusion in generated routes;
- displaying a representation of the alternative route; and
- upon receiving an input indicating a selection of the alternative route, providing navigation instructions for guiding a user as the user navigates the alternative route based at least in part on a location of the navigation device that is determined using a global positioning system (GPS) as the navigation device proceeds along the alternative route.

2. The method of claim 1, wherein the step of obtaining the first route comprises generating a route between an origin and a destination, wherein the first route corresponds to the generated route, and the first and second locations are respectively the origin and destination of the generated route.

3. The method of claim 1, wherein the first route corresponds to a remainder of a predetermined route being navigated.

4. The method of claim 1, wherein the distance between the first location and the second location is measured along the route between the first and second locations.

5. The method of claim 1, wherein the routing algorithm used to generate the alternative route has a cost function that is used to determine a cost for traversing segments of the map, the generated alternative route being a least cost route between the first location and the second location, and wherein the one or more identified segments are penalized by applying a cost penalty to the segment, such that the cost for traversing each of the one or more identified segments is higher than would otherwise be assigned to the one or more identified segments.

6. The method of claim 5, wherein each of the segments of the map is associated with attribute data representative of one or more attributes associated therewith, wherein the cost of traversing a segment is based at least in part on the attribute data associated with the navigable segment, and wherein the one or more identified segments are penalized by applying the cost penalty to the segment, such that the cost for traversing each of the one or more identified segments is higher than would otherwise be determined based upon the attribute data associated with the segment.

7. The method of claim 1, comprising inputting the distance between the first and second locations into a function which operates on the input distance to provide an output that is the relative extent of the central portion along the first route for that distance, the function being arranged to provide an output relative extent for the central portion along a given first route for any input distance between first and second locations between which the given first route extends that is inversely related to the distance between the first and second locations.

8. The method claim 1, further comprising identifying a central point along the length of the first route between the first location and the second location, and defining the central portion about the central point.

9. The method of claim 1, further comprising:
- defining, using the processor, a central portion of the generated alternative route, wherein the central portion of the generated alternative route has an extent along the generated alternative route that is determined based on a distance between the first and second locations, wherein the relative extent of the central portion of the generated alternative route along the generated alternative route is inversely related to the distance between the first and second locations;
- identifying, using the processor, one or more navigable segments forming the defined central portion of the generated alternative route;
- generating a further alternative route comprising a plurality of segments between the first location and second location using a routing algorithm in which the one or more identified segments of the central portion of the first route and the central portion of the generated alternative route are penalized, such that each of the one or more identified segments are less favorable for inclusion in generated routes.

10. The method of claim 1, further comprising determining whether the generated alternative route is an acceptable alternative route by assessing a similarity of the generated alternative route to the first route, wherein the assessment is carried out by reference to a proportion of the alternative route that is shared with the first route.

11. The method of claim 10, further comprising determining that the alternative route is acceptable when the similarity of the route to the first route is below a given threshold.

12. The method of claim 10, further comprising, if the alternative route is deemed not to be acceptable as being too similar to the first route, generating another alternative route comprising a plurality of segments between the first location and second location using a routing algorithm in which the one or more identified segments of the central portion of the first route are further penalized, such that each of the one or more identified segments are even less favorable for inclusion in a generated route.

13. The method of claim 1, wherein providing, to the user, the set of navigation instructions to guide the user along the alternative route comprises:
- visually, audibly, or haptically providing navigation instructions from the set of navigation instructions to the user to inform the user of actions to be taken while the user is being guided along the alternative route.

14. A navigation device comprising, one or more processors and a memory storing an electronic map, the map comprising a plurality of segments representing navigable segments of a navigable network in a area covered by the electronic map, the one or more processors being arranged to:

obtain a first route comprising a plurality of segments between a first location and a second location in the map;

define a central portion of the first route, wherein the central portion has an extent along the first route that is determined based on a distance between the first location and the second location, wherein a relative extent of the central portion along the first route is inversely related to the distance between the first location and the second location;

identify one or more navigable segments forming the defined central portion along the first route;

generate an alternative route comprising a plurality of segments between the first location and the second location using a routing algorithm in which the one or more identified segments of the central portion of the first route are penalized, such that each of the one or more identified segments are less favorable for inclusion in generated routes;

display a representation of the alternative route; and upon receiving an input indicating a selection of the alternative route, providing navigation instructions for guiding a user as the user navigates the alternative route based at least in part on a location of the navigation device that is determined using a global positioning system (GPS) as the navigation device proceeds along the alternative route.

15. A non-transitory computer readable medium comprising instructions which, when executed by one or more processors of a navigation device, cause the navigation device to perform a method of generating routes in an area covered by an electronic map, the map comprising a plurality of segments representing navigable segments of a navigable network in the area covered by the electronic map, the method comprising:

obtaining, using a processor, a first route comprising a plurality of segments between a first location and a second location in the map;

defining, using the processor, a central portion of the first route, wherein the central portion has an extent along the first route that is determined based on a distance between the first location and the second location, wherein a relative extent of the central portion along the first route is inversely related to the distance between the first location and the second location;

identifying, using the processor, one or more navigable segments forming the defined central portion along the first route;

generating, using the processor, an alternative route comprising a plurality of segments between the first location and the second location using a routing algorithm in which the one or more identified segments of the central portion of the first route are penalized, such that each of the one or more identified segments are less favorable for inclusion in generated routes;

displaying a representation of the alternative route; and upon receiving an input indicating a selection of the alternative route, providing navigation instructions for guiding a user as the user navigates the alternative route based at least in part on a location of the navigation device that is determined using a global positioning system (GPS) as the navigation device proceeds along the alternative route.

* * * * *